United States Patent [19]

Aharoni et al.

[11] 4,336,356

[45] Jun. 22, 1982

[54] PRODUCTION OF OZONIDES FROM UNSATURATED POLYMERS

[75] Inventors: Shaul M. Aharoni, Morris Plains; Dusan C. Prevorsek, Morristown; George J. Schmitt, Madison; Gary A. Harpell, Morristown; Lester T. C. Lee, Parsippany, all of N.J.

[73] Assignee: Allied Corporation, Morris Township, Morris County, N.J.

[21] Appl. No.: 180,753

[22] Filed: Aug. 25, 1980

Related U.S. Application Data

[62] Division of Ser. No. 969,917, Dec. 15, 1978.

[51] Int. Cl.$^3$ ............................................. C08F 8/06
[52] U.S. Cl. ............................... 525/388; 252/52 R; 525/333; 525/334; 525/335; 525/338; 525/339; 525/345; 525/356
[58] Field of Search ............... 525/388, 338, 339, 356, 525/359; 252/52 R

[56] References Cited

U.S. PATENT DOCUMENTS

| | | | |
|---|---|---|---|
| 3,519,588 | 7/1970 | Hagmayer et al. | 525/388 |
| 3,655,834 | 4/1972 | Wisseroth et al. | 525/388 |
| 3,682,854 | 8/1972 | Bennahmias et al. | 525/388 |
| 3,692,877 | 9/1972 | Shibahara et al. | 525/388 |
| 3,756,999 | 9/1973 | Stetler et al. | 525/388 |
| 3,857,826 | 12/1974 | Greene et al. | 525/388 |
| 3,980,682 | 9/1976 | Danner et al. | 525/388 |
| 4,139,689 | 2/1979 | Hockreuter et al. | 525/388 |

FOREIGN PATENT DOCUMENTS

| | | | |
|---|---|---|---|
| 12316 | 6/1980 | European Pat. Off. | 525/388 |
| 590314 | 1/1978 | U.S.S.R. | 525/388 |

*Primary Examiner*—William F. Hamrock
*Attorney, Agent, or Firm*—Alan M. Doernberg; Gerhard H. Fuchs; Richard C. Stewart, II

[57] ABSTRACT

Partially unsaturated polymers are dissolved in a two component solvent comprising a first component having a reactivity toward ozone less than carbon-carbon double bonds but more reactive than carbon-carbon single bonds and a second component being inert toward ozone. Introduction of ozone into the solution produces ozonides which are readily cleft into difunctional aliphatic species that can be converted to e.g. carboxy-terminated or multifunctional carboxy substituted aliphatic compounds. These may be used as monomeric species in various polymerization schemes as such, in preparation of polyamides, for example, or may be reduced to aldehydes or alcohols to be used in the preparation of such polymers as polyesters, polyurethanes, poly (Schiff bases), etc. The carboxylated products may also be employed as ionomers, which are useful as surfactants. Monocarboxyl terminated polyethylene having a number average molecular weight of from about 4,000 to 100,000 are provided. Poly(carboxymethyl) substituted polyethylenes, wherein from about 0.05 to 1.3 percent of the hydrogen atom or polyethylene are substituted with carboxymethyl groups, are obtained.

19 Claims, No Drawings

PRODUCTION OF OZONIDES FROM UNSATURATED POLYMERS

This is a division of application Ser. No. 969,917 filed Dec. 15, 1978.

FIELD OF THE INVENTION

This invention relates to a process for producing functional or multifunctional monomers from long chain partially unsaturated polymers by an ozonization process and to certain novel ozonides obtained thereby.

BACKGROUND OF THE INVENTION

Aliphatic diols, diacids and their derivatives [diamines, diisocyanates, etc.] with sizable molecular weights are technologically important and presently commercially unavailable monomers.

Phillip S. Bailey in *Chemical Reviews*, Vol. 58, page 925 [1958] describes a review of the reactions of organic compounds with ozone. On page 957 he discloses an order of decreasing ease of ozonolysis for simple and substituted systems qualitatively as follows: simple alkenes: easier than anthracene: easier than phenanthrene: easier than naphthalene: easier than benzene.

E. B. Jones et al. in *Journal of Polymer Science Part A*, Vol. 2, page 5313 [1964] discloses that butyl rubber dissolved in methyl cyclohexane is ozonized and reduced to produce polyisobutylene glycol.

Thomas W. Boyer in U.S. Pat. No. 3,346,631 discloses the preparation of a liquid carboxylated polymer by dissolving a solid or liquid polymer, derived from the polymerization of a conjugated diene monomer or mixture of such monomers with other monomers copolymerizable therewith, in a solvent of a type which is suitable as a medium for carrying out ozonization reactions, contacting the resulting solution with ozone and processing the ozonized polymer, for example, with steam to form the carboxylated polymer. Suitable solvents disclosed are carbon tetrachloride, paraffinic solvents such as pentane, hexane and heptane, aromatic solvents such as benzene and toluene.

Albert F. Preuss in U.S. Pat. No. 3,417,020 discloses the preparation of oil-soluble saturated aliphatic polymers by contacting a polyolefin or mixtures of polyolefins in liquid state with ozone. Since the polyolefins tend to be viscous, it is desirable according to Preuss to extend them with one or more solvents which are inert to ozone under the conditions of the reaction, such as hexane, heptane/methanol, toluene/methanol, hexane/methanol or octanol/decanol.

G. W. Burton in U.S. Pat. No. 3,514,432 discloses the preparation of carboxy terminated polyiso olefins by ozonization of a particular type of butyl rubber dissolved in a solvent including aliphatic hydrocarbons, such as pentane, hexane, heptane or the like or their chlorinated derivatives in the presence of a pyridine.

John E. Manton et al. in Canadian Pat. No. 792,805 issued Aug. 20, 1968 disclose that substantially saturated alpha-omega dihydroxy liquid polymers may be prepared by ozonizing a solid copolymer comprising 90 to 95 mol percent of an acyclic $C_{2-8}$ mono olefinic hydrocarbon copolymerized with 10 to 0.5 mol percent of an acyclic $C_{4-12}$ diolefinic hydrocarbon and dissolved in a suitable inert solvent such as pentane, hexane, cyclohexane, or carbon tetrachloride. The ozonization proceeds until substantially all of the olefinic bonds in the backbone chains of the copolymer molecules have been converted into ozonide structures and the ozonide structures are then cleaved by a reducing agent to form the liquid polymer.

Polymer Corporation Limited discloses in Belgium Pat. No. 773,052 the preparation of new polymers with reactive terminal groups by dissolving a high molecular weight polymer containing at least 5 mol percent of carbon-carbon double bonds, preferably in an aliphatic or saturated cycloaliphatic or a halogenated hydrocarbon, and then ozonizing the polymer. It is further disclosed that the treatment of ethylene-butadiene copolymers with ozone in an inert solvent, such as tetrachloroethane leads to products which after polyesterification or polyamidation are highly cross-linked and deeply discolored.

Liquid carboxyl-terminated polymers have been disclosed by J. M. Meyer in U.S. Pat. No. 3,910,990. They are obtained by dissolving copolymers of ethylene with 1-olefins having up to 20 carbon atoms in an ozone resistant solvent and contacting the resulting solution with ozone.

Greene et al. in U.S. Pat. No. 3,857,826 disclose preparation of fluid, hydroxyl-terminated ethylene/propylene copolymers by ozonolysis of a random ethylene/propylene/butadiene terpolymer at temperatures below 0° C. in a solvent containing up to 5 weight percent of ethanol or a higher alcohol.

Ionizable acids can be introduced into polymers conventionally by either (1) chain termination during the polymerization, by the introduction of acid bearing or acid forming self terminating monomers; (2) copolymerization with acid bearing monomers to obtain various amounts and distributions of acid groups pendent from the main chain; and (3) by a random reaction of an ionizable species with a side group along the chain for yielding random distribution of ionizable end groups. Examples for the first approach are the carboxy terminated polyisobutylene rubbers; for the second approach are the copolymers of acrylic or methacrylic acids; and by the third approach are the sulfonated polystyrenes.

The introduction of ionizable carboxy groups is associated with either a limitation of the molecular weights of the ionomer or with a pronounced change in the characteristics of the polymer chain or both.

While the processes disclosed in the prior art in part give molecules of a desired size by ozonizing a partially unsaturated polymer, at the same time these products also contain other materials resulting from reaction of the ozone with carbon-carbon single bonds in the chain, as well as with saturated carbon atoms resulting in products having carbon chains with hydroxy, epoxy and keto groups, for instance, incorporated therein.

Although it is well recognized that long aliphatic difunctional (i.e. dihydroxy, dicarboxy or diamines, etc.) monomers have large commercial potential, products obtained by ozonolysis methods described by the prior art are deficient in several respects, as set forth above.

In addition, it is desirable to react pendant carbon-carbon double bonds in polymeric materials to produce reactive functionalities such as carboxy or hydroxyl. Such material with reactive functionalities may be utilized to produce graft copolymers and cross-linked networks.

SUMMARY OF THE INVENTION

In accordance with the present invention, a method is provided for selectively ozonizing the carbon-carbon double bonds of an olefinically unsaturated organic polymer also containing carbon-carbon single bonds. The polymer is dissolved in a two-component solvent system. The first component is less reactive than the polymer double carbon-carbon bonds but more reactive than said single carbon-carbon bonds toward ozone. The second component is substantially inert to ozone under the reaction conditions. The solution is contacted with ozone containing gas. The ozonides formed may then be cleaved to produce more stable products.

Starting polymers with partial unsaturation are formed by copolymerization of dienes or by addition reactions to unsaturated polymers or by elimination reactions of saturated polymers. They include high molecular weight polymers which may contain as backbone two or more of the structures

 (A)

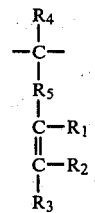 (B)

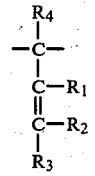 (C)

 (D)

where $R_1, R_2, R_3, R_4$ and $R_4'$ are independently for each substructure hydrogen, halogen, alkyl-substituted amino, oxy, peroxy or hydroxy radicals, ether groups, hydrocarbon radicals or substituted hydrocarbon radicals; and $R_4$ and $R_4'$ together can be oxo or thio; $R_5$ is a divalent hydrocarbon radical, substituted hydrocarbon radical, ether radical, divalent sulfide, sulfone and the like, divalent nitrogen and the like;

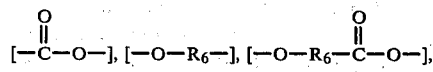

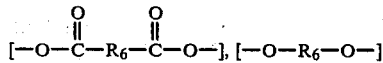

where $R_6$ is a divalent hydrocarbon radical or substituted hydrocarbon radical, divalent sulfide, sulfone and the like, divalent nitrogen radical and the like. The backbone chains have end groups including one or more of the structures

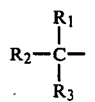 (E)

 (F)

wherein $R_1$, $R_2$, $R_3$ are independently hydrogen, halogen, alkyl-substituted amino, peroxy or hydroxy radicals, ether groups, hydrocarbon radicals or substituted hydrocarbon radicals and where $R_1$ and $R_2$ together can be oxo or thio radicals.

The ozonolysis method of the present invention is distinguished from the methods described in the prior art by (1) being confined to the double bonds, and complete attack thereof and (2) the absence of the thermally unstable reactive sites in the molecule of the reaction product. The second characteristic is verified by lack of color in the resulting melt polymerization products.

A relatively low molecular weight carboxy terminated polymer is prepared by ozonization and following cleavage from a copolymer containing the required amount and distribution of double bonds along the chain for yielding the desired molecular weight of the ozonized product. For long chain polymer starting materials without branching or pendant unsaturation a reaction product results with not more than two reactive sites per molecule. This is observable through complete lack of cross-linking during such polymerization reactions as melt polyesterification or polyamidation. For the preparation of ionomers, the diacids [or in case of starting materials containing either branches or pendant unsaturation, polyacids] are subsequently reacted with a base to yield the corresponding salts.

Certain of the ozonides produced by the process of this invention are novel compounds having outstanding unexpected properties. Monocarboxyl-terminated polyethylenes are obtained having a number average molecular weight of from about 4,000 to 100,000. Poly(carboxymethyl) substituted polyethylenes are obtained having from about 0.05 to 1.3 percent of the hydrogen atoms of polyethylene substituted with carboxymethyl groups.

DETAILED DESCRIPTION OF THE INVENTION

We have found that ozonide groups at the sites of double carbon-carbon bonds of aliphatic polymers can be formed selectively, i.e. without attacking the single carbon-carbon bonds. Cleavage of these ozonides yields purely difunctional aliphatic compounds when the starting polymer is linear and contains no pendant carbon-carbon double bonds. It is essential that the ozonization reaction be carried with no or minimal attack on the aliphatic portions of the starting materials, a feature of the process not attainable by previous ozonolysis methods.

A critical feature of the process of the present invention is the use of a particular complex solvent system, consisting of at least two solvents. The first component is more reactive toward ozone than the single bonds of the polymeric starting material but less reactive toward ozone than the polymer double bonds. The second component should be substantially inert to ozone under the reaction conditions.

Starting Compounds

Starting polymers can comprise copolymers of -ene and -diene monomers. Such -ene monomers include alkenes having up to twelve carbon atoms, alkene carbonic acids having up to five carbon atoms and their alkyl esters, and vinyl and isopropyl aromatic compounds. Such compounds include alkyl acrylate, alkyl methacrylate, any alkene-1, styrene, isopropenyl benzene. Preferred monomers are ethylene, propylene, butene-1, isobutene, pentene-1, hexene-1, heptene-1, styrene, acrylic acid, acrylic ester, acrylonitrile, methylacrylate, methylmethacrylate. Diene monomers include straight, branched or cyclic dienes having up to about ten carbon atoms and their derivatives having part of hydrogen atoms substituted by halogens. Such compounds include 1,3-butadiene, 2,3-dimethyl butadiene, 1,3-pentadiene, 1,3-hexadiene, 1,3-heptadiene, 1,3-octadiene, 1,3-cyclohexadiene, 1,3-cyclooctadiene, 2-chloro-1,3-butadiene, isoprene, 1,4-hexadiene. Conjugated dienes are preferred for introduction of backbone unsaturation.

Polymers useful as a starting material for the method of the present invention include homopolymers and copolymers containing double bonds made of straight chain or branched or cyclic alkenes having between about two and eight carbon atoms and/or vinyl and/or isopropenyl aromatics. Such unsaturated compounds include ethylene, propylene, isobutylene, 2-methyl-butylene-1, 2-methyl-pentene-1, hexene, styrene, halogenated vinylaromatics and isopropenylbenzene. Useful hydrocarbon monomers having 2 double bonds for production of such polymers, include straight, branched or cyclic alkadienes having up to about ten carbon atoms and their derivatives having part of the hydrogen atoms substituted by halogen and/or aryl groups. Such compounds include butadiene-1,3, allene, cyclopentadiene, pentadiene-1,3, hexadiene-2,4, 2-methyl-hexadiene-1,5, 2,5-dimethyl-hexadiene-1,5, isoprene, 2-ethyl-butadiene-1,3, 2-propyl-butadiene-1,3, 2-phenylbutadiene-1,3, 2,3-dimethyl-butadiene-1,3, 2-methyl-pentadiene-1,3, 3-propyl-hexadiene-1,3 and the like. Preferably the double bonds in the copolymer are derived from one or more monomers being members of the group of butadiene, isoprene, 2,3-dimethylbutadiene, 1,4-hexadiene, cyclohexadiene, which monomer is copolymerized with an alkene-1. Preferably the alkene-1 comonomer comprises a member of the group consisting of ethylene, propylene, 1-butene, 1-pentene, 1-hexene. Furthermore, the aliphatic unsaturated compound employed as starting material in the present invention can have pendant carbon-carbon double bonds for preparing polyfunctional hydrocarbon polymers. Polymers useful in the invention include high molecular weight polymers which can contain as backbone two or more of the structures

(A)

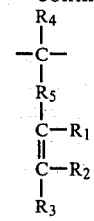
(B)

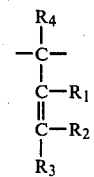
(C)

(D)

where $R_1$, $R_2$, $R_3$, $R_4$ and $R_4'$ are independently for each substructure hydrogen, halogen, alkyl-substituted amino, oxy, peroxy or hydroxy radicals, ether groups, hydrocarbon radicals or substituted hydrocarbon radicals; and $R_4'$ and $R_4$ together can be oxo or thio; $R_5$ is a divalent hydrocarbon radical, substituted hydrocarbon radical, ether radical, divalent sulfide, sulfone and the like, divalent nitrogen and the like;

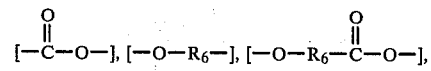

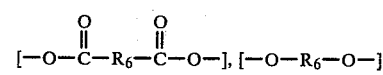

where $R_6$ is a divalent hydrocarbon radical or substituted hydrocarbon radical, divalent sulfide, sulfone and the like, divalent nitrogen radical and the like.

The backbone chains have end groups including one or more of the structures

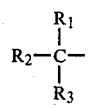
(E)

(F)

where $R_1$, $R_2$, $R_3$ are independently hydrogen, halogen, alkyl-substituted amino, peroxy or hydroxy radicals, ether groups, hydrocarbon radicals or substituted hydrocarbon radicals and wherein $R_1$ and $R_2$ together can be oxo or thio radicals. Optionally structures of the type $(R_7)_x-$ can be incorporated in the polymer for obtaining a branched polymer wherein $R_7$ is a polyfunctional hydrocarbon radical having a functionality of x where x is between about 3 and 100. Such polyfunctional hydrocarbon radicals are formable e.g. by employing divinylbenzene as polymerization agent. Other terminal groups include carboxyl, aldehyde, halogenated hydrocarbon radicals. Polymers suitable as starting material for reaction with ozone may be homopolymers, graft polymers, block copolymers. The polymers can be linear or branched. Long sequences of structure (A) or sequences containing more than about 20 mole percent of structure (A) are undesirable because low molecular weight products will result from a reaction with ozone. In general (A) will be isolated between structure (B), (C) and/or (D). Preferably, between about 20 and 20,000 units of (B), (C) and/or (D) are placed between successive units of (A).

Such polymers are terminated by end groups such as (E) and/or (F). The molecular weight of starting polymers for the present invention is not critical except that solutions of the polymer have to be prepared. The polymers useful as starting materials in the present invention include the types:

I. Polymers containing a single double bond. Such polymers comprise the repeat Unit (D) with a terminal structure having a carbon-carbon double bond as F. The number average molecular weight Mn of this type of polymer can be between about 1,000 and 20,000 and preferably between about 5,000 and 15,000. The resulting ozonization product in this case exhibits a substantially similar molecular weight as the starting material.

II. Polymers containing multiple internal double bonds. Such polymers are represented by structure (A) together with structure (D). The number ratio of (D)/(A) should be greater than 2:1 and preferably be greater than 4:1 and more preferably be greater than 20:1. The number average molecular weight, Mn, of this type of polymer can be between about 10,000 and 10,000,000 and preferably between about 50,000 and 1,000,000. Applying the process of the present invention, such polymers lead to difunctional oligomers and polymers. The resulting ozonization products have number average molecular weights of between about 500 and 50,000. III. Polymers containing multiple pendant carbon-carbon double bonds. Such polymers may be represented by structures containing units (B) and/or (C) with optionally (D) units present. The number average molecular weight, Mn, of this type of polymer can be between about 10,000 and 10,000,000 and preferably between about 50,000 and 1,000,000. Such polymers lead to polyfunctional products. The resulting ozonization products in this case have molecular weights substantially similar to those of the starting materials. IV. Polymers containing both internal and pendant double bonds. Such polymers may be represented by structures containing (A) units together with (B) and/or (C) units and optionally (D) units present. The number average molecular weight, Mn, of this type of polymer can be between about 10,000 and 10,000,000 and preferably between about 50,000 and 1,000,000. Such polymers lead to multifunctional products of lower molecular weight than the starting material. The resulting ozonization products in this case have molecular weights of between about 500 and 50,000.

Polymers useful in the invention for preparing multifunctional hydrocarbon oligomers include aliphatic unsaturated compounds having both pendant and backbone carbon-carbon double bonds. Polymers suitable as starting materials include terpolymers comprising ethylene, propylene and the like and an olefin of the group consisting of butadiene, isoprene, pentadiene, cyclopentadiene, hexadiene and cyclohexadiene. Preferred starting materials include polyethylene modified with butadiene and partially hydrogenated, halogenated or hydrohalogenated polyunsaturated polymers.

Copolymers of acrylonitrile-butadiene are disclosed by R. Drake et al. in *SAMPLE Quarterly*, July 1975. Vinyl terminated liquid polymers are disclosed in a publication by B. F. Goodrich Chemical Company, Cleveland, Ohio entitled *Hycar® Elastomers*.

For example, ethylene-butadiene copolymer can be used as starting material. It can be prepared according to the procedure given by S. Cucinella et al. in *European Polymer Journal* 12, 65 (1976). Terpolymers such as ethylene, propylene and 1,4-hexadiene copolymers from suitable starting materials for the process of the present invention.

Alternatively, starting polymers can be prepared by elimination reaction from saturated polymers and copolymers. Eliminated parts of the polymer include water from alcoholic groups, acids from ester groups, hydrogen halide or halogen from halopolymers and hydrogen by catalytic dehydrogenation.

Alternatively, starting polymers are the product of reacting a polyolefin containing high concentrations of tertiary carbon atoms (e.g. polypropylene) with an organic peroxide such as dicumyl peroxide, 2,5-dimethyl-2,5-di(t-butylperoxy)hexane, di-t-butyl peroxide or the like.

Alternatively, starting materials are the product obtained from polyunsaturated polymers by reducing the unsaturation by addition reaction. Partial addition of suitable groups such as hydrogen or halogens to polyunsaturated polymers results in olefinically unsaturated starting materials of the present invention. Polyunsaturated polymers include natural rubbers, cis- or trans-1,4-polyisoprene, styrenediene copolymer, polyisoprene-polystyrene block copolymer, polybutadiene-polystyrene-polybutadiene block copolymer, butadiene-acrylonitrile copolymer, polymerized chloroprene, polypentadiene, diene polymers having mixed microstructures, polyalkenamers such as polypentenamer, polyhexenamer, and the like. Polyunsaturated polymers include the previously mentioned starting materials of the ozonization process of the present invention and the degree of their unsaturation can be reduced by an addition reaction taking place before the ozonization process. Preferred olefinic polyunsaturated compounds include members of the group cis 1,4-polyisoprene, trans 1,4-polyisoprene, polyisoprene, polybutadiene, polypentenamer and polyhexenamer. Polyalkenamers can be obtained by metathesis of cycloalkenes. The metathesis of unsaturated hydrocarbons catalyzed by transition metal compounds is reviewed by Mol et al. in Adv. in Catalysis, Vol. 2 (1975), page 131. Polypentenamer is reviewed by Calderon and Hinrichs in Chem. Tech., Oct. 1974, page 627. Suitable reagents for partial addition reactions of unsaturated polymers include hydrogen, halogen, hydrohalic acids, oxygen, water, alcohols, carbonic acids, hypochloric acid, sulfonyl chloride, aromatic hydrocarbons and carbon monoxide plus water in an oxo reaction. Preferred reagents for partial addition reactions include hydrogen, halogen and hydrohalic acids.

Partial hydrogenation is a particularly attractive method of reducing the amount of unsaturation. A wide variety of amorphous and crystalline polymers, suitable for ozonolysis, may be prepared from high volume relatively inexpensive general purpose elastomers. Hydrogenation reactions are well known to those skilled in the art. J. C. Falk, Makromol. Chem, 160, 291 (1972). J. W. Kang, U.S. Patent 3,993,855. J. C. Falk, J. Polymer Sci., A-1, 2617 (1971). M. M. Wald and M. G. Quam, U.S. Pat. No. 3,595,942.

Similarly, incorporation of halogen is a well known art and has the advantage of decreasing the flammability of the polymer and formulations which incorporate it. Experimental details on the incorporation of halogen in butadiene polymers are given in Research Bulletin D-3, Halogenation of Poly bd ®, Arco Chemical Company. Partial hydrogenation and halogenation may be carried out to obtain polymers having the desired structure and concentration of carbon-carbon double bonds.

The polymeric starting materials of the present invention are the product of three types of reactions:

(A) Starting Materials by Coordination Catalysts

Copolymers of 1-alkenes and a variety of nonconjugated dienes (including aliphatic, or straight-chain types, and bicyclic compounds of the norborene or norboradiene series) are the product obtained by using coordination catalyst in organic solvents such as benzene, cyclohexane, chlorobenzene, pentane or heptane. Catalyst systems based on combinations of vanadium compounds and aluminum alkyls are effective. E. K. Gladding et al. (Rubber Chem and Tech 35, 1114 (1962) report in detail on the preparation of ethylene, propylene and 11-ethyl-1,11-tridecadiene using a catalyst of aluminum triisobutyl and vanadium oxytrichloride in the ratio of 2:1 by weight.

A wide variety of nonconjugated dienes, available using classical synthetic procedures, have been copolymerized. The terminal double bond of the aliphatic dienes is active in the polymerization reaction but the internal double bond is inactive and appears as a pendant carbon-carbon double bond on the polymer backbone.

Butadiene has been successfully polymerized by coordination catalysts to give cis-polybutadiene and is commercially available. Phillips Petroleum Co., Belg. Pat. 551,851 (1957). *Rubber World* 134 (2), 268 (1956). Goodrich Gulf, Belg. Pat. 575,671 (Feb. 13, 1959). Shell Oil Co., U.S. Pat. No. 3,006,125 (Nov. 27, 1962). Montecatini, Belg. Pat. No. 580,103 (June 26, 1959).

(B) Starting Materials by Polymerization With Anionic Catalysts

Conjugated dienes, such as butadiene or isoprene, form starting materials by solution polymerization using alkaline metals or alkaline metal alkyl initiators in a variety of organic solvents, including benzene, toluene, hexane, cyclohexane, tetrahydrofuran, dioxane and the like. Alkali metal salts of conjugated aromatics, such as naphthalene, biphenyl and the like, in polar solvents such as tetrahydrofuran, dioxane and the like are also effective initiators. It is relatively easy to copolymerize these monomers with a variety of vinyl aromatics such as styrene, 4-methylstyrene, 2,4-dimethylstyrene, 4-t-butylstyrene and the like.

The microstructure of the diene polymer is very dependent on the initiator species and the nature of the solvent (Encyclopedia of Polymer Science, Anionic Polymerization Section, Volume 2, page 95, John Wiley and Sons 1965). In hydrocarbon solvents such as benzene or hexane, using a lithium alkyl such as sec-butyl lithium, the polymerization of both butadiene and isoprene is predominantly 1,4 leading to a polymer in which most of the unsaturation is present in the polymer backbone. In polar solvents, such as tetrahydrofuran, the polymerization gives a much lower concentration of 1,4 addition products and a significant concentration of carbon-carbon double bonds pendant to the hydrocarbon backbone are produced.

A wide variety of block copolymers obtained by simply adding a second monomer after the completion of the polymerization of this first monomer from starting materials and their preparation and properties have been revised by R. Zelinski and C. W. Childers, Rubber Chem. and Tech. 41, 161 (1968).

Functionally terminated low molecular weight polybutadienes have been prepared. This work has been reviewed by D. M. French (Rubber Chem and Tech 42, 71 (1969).

(C) Starting Materials by Free Radical Polymerization

Starting materials are obtainable from conjugated dienes, such as butadiene and chloroprene, by copolymerization by free radical reaction. W. H. Shearon, J. P. McKenzie and M. E. Samuels, *Ind. Eng. Chem.* 40, 769 (1948); R. L. Bebb, E. L. Carr, and L. B. Wakefield, *Ind. Eng. Chem.* 44, 724 724 (1952) and Siebert, U.S. Pat. No. 3,285,949.

In a preferred embodiment of the present invention the unsaturated compound has essentially a straight main chain containing a plurality of double bonds.

The desirable range of molecular weights of the starting polymer is very broad and can extend from about 1,000 to 10,000,000 or more and a medium range lies between about 30,000 and 2,000,000. In principle it is limited only by the solubility. The molecular weight distribution is not critical. Our method can be applied to essentially monodisperse systems having an $M_w/M_n$ ratio of unity and to polymers having very large $M_w/M_n$ ratio (i.e. 50 or more).

Solvents

The chemical composition of the two component solvent system for the polymer is critical. It is desirable that the first component or mixture of components be miscible with the second component of the solvent system and not induce precipitation of the starting material from solution. The most important function of this first component is to prevent ozone attack on the aliphatic C—C single bonds of the starting material.

This is achieved by the first component being less reactive to ozone than the carbon-carbon double bond but more reactive than the carbon-carbon single bond in the starting material. We found that compounds meeting these requirements include aromatic hydrocarbons, mono and polyhalogenated derivatives of same, and carbonyl compounds and their mixtures. Preferred aromatic hydrocarbons include mono- and di-nuclear aromatic hydrocarbons and their monoara derivatives, optionally having hydrogen atoms substituted by from one to four members of the group consisting of methyl, ethyl and isopropyl, optionally having hydrogen atoms substituted by from one to six members of the group consisting of chlorine and bromine. Examples of aromatic hydrocarbons and their halogenated derivatives, useful as first component of the solvent, are benzene, toluene, xylene, chlorobenzene, bromobenzene, o-chlorotoluene, monochloroxylene, bromotoluene, mono- or dichloronaphthalene, benzylchloride, dichlorobenzene, naphthalene, biphenyl, tetrahydronaphthalene, indane and the like.

Examples of carbonyl compounds useful as first component of the solvent are aldehydes and ketones. Preferred carbonyl compounds include substituted formaldehydes wherein optionally one or two of the hydrogen atoms are substituted by a member of the group consisting of the radicals alkyl with up to nine carbon atoms, alkenyl with up to eight carbon atoms, haloalkenyl with up to five carbon atoms, phenyl, benzyl, naphthyl, biphenyl. Aldehydes useful in the present invention include 1-alkanals having between about 1 and 20 carbon atoms, formaldehyde, acetaldehyde, propionaldehyde, isobutyraldehyde, valinaldehyde, isovalinaldehyde, caproaldehyde, enanthaldehyde, caprylaldehyde, cyclohexene carbaldehyde, glyoxal, succinaldehyde, malealdehyde, chloral, aldol, benzaldehyde, p-tolualdehyde, p-isopropylbenzaldehyde, o-chlorobenzaldehyde, salicylaldehyde, anisaldehyde, phenylacetaldehyde.

Ketones useful in the present invention include 2-alkanones having between 3 and 20 carbon atoms, 3 alkanones having between 5 and 20 carbon atoms, acetone, methylethylketone, methyl n-propyl ketone, methyl isopropyl ketone, diethyl ketone, methyl n-butyl ketone, methyl isobutyl ketone, pinacolone, methyl n-amyl ketone, diisopropyl ketone, 1-cyclohexyl-1-propanone, 2,4-pentanedione, 4-oxocyclohexane carboxylic acid, acetol, acetoin, acetopropanol, diacetone alcohol, chloracetone, cyclopentanone, cyclohexanone, cyclopentadecanone, decahydronaphthalene-on-1, camphor, fenchone, acetophenone, benzophenone. Preferably the ketone or aldehyde has carbon chains and/or rings with up to ten carbon atoms. Preferred first components have boiling points from about 100° C. to 350° C.

The second component of the solvent system is substantially inert to ozone under the reaction conditions. This component comprises saturated organic compounds and include cyclic hydrocarbons, linear hydrocarbons, branched hydrocarbons, chlorinated hydrocarbons, nitriles such as decahydronaphthalene, camphane, pinane, carane, thizane, p-menthane, 1,3-dimethyl cyclohexane, cycloheptane, cyclooctane, methyl-cyclopentane, methyl-cyclohexane, cyclohexanyl carbonitrile, tetrachloroethane, trichloroethane, dichloroethane, dichloromethane, heptane, hexane, 1-chloroheptane, 1-chlorooctane, isochloropropane, chlorocyclohexane, bromocyclohexane, diheptyl ether, cyclopentane, cyclohexane, and methylcyclohexane and mixtures thereof. Preferred inert solvents have boiling points from about 60° C. to 300° C.

A preferred solvent mixture is provided by a combination of toluene and 1,1,2,2-tetrachloroethane. Another preferred solvent is provided by a combination of xylene and decahydronaphthalene.

The polymer is dissolved in the inert solvent for obtaining a solution of proper viscosity. The viscosity of the solution can be in the range of between about 0.1 cp and 60,000 cp and preferably between 0.5 cp and 10,000 cp.

As a matter of convenience polymerization may take place in the inert solvent and the polymer never isolated prior to reaction with ozone. In cases where polymer modification, such as halogenation and/or hydrogenation, is desirable this too may be accomplished prior to ozonolysis without isolating the polymer.

The concentration of the polymer solution can vary over a wide range. The upper limit of the concentration of the polymer is determined by effectively and uniformly contacting the double bonds in a viscous solution with the ozone. Preferred ranges of concentration are between 2 and 20% polymer by weight and more preferred is the range of between about 5 and 8 weight percent polymer in the solution.

The relative amounts of the first and second components in the solvent mixture depends on the nature of the starting material, temperature of the process, reactivity of the reactive component, solubility and miscibility, which can be varied over a wide range. The first component can be in a range of 5 to 90 volume percent. For economical reasons, it is, however, preferred to keep the reactive first component as a minor component (i.e. less than 50% of volume). A preferred range for the reactive component is between 5 and 20 volume percent. Finally, it is possible that under certain circumstances the reactive first component could become the major component of the solvent system. The second component can amount to a range between 10 and 98 volume percent of the solvent.

Solvent mixtures of decahydronaphthalene and xylene are effective over the range with 2 to 30 weight percent xylene and especially in the range of 10 to 20 weight percent xylene. The amount of polymer dissolved can be up to 10% polymer by weight of the polymer relative to the volume of the solvent. The solution in the mixture and the ozonization in the mixture take place at temperatures between about 20° C. and 160° C. The temperature most suitable for ozonization is slightly higher than the precipitation temperature of the polymer in the solvent. Xylene with a boiling point of about 130° C. to 144° C. is preferably used.

The aromatic double bonds of the solvent are less prone to attack than aliphatic double bonds but more prone to attack than the aliphatic single bonds of the polymer. Hence, the ozonization will first attack the aliphatic double bonds of the starting material since they are the most prone to such an attack. Then the aromatic double bonds of the solvent system will be attacked. Only later will the bonds less prone to attack in the reaction mixture, the aliphatic single bonds of the starting material and of the second solvent, be attacked. Since the solvent contains a preponderance of such single bonds, any attack on the single bonds of the polymer will be proportional to its concentration relative to the aliphatic solvent in the system. This attack will become significant as the supply of easily attacked aromatic double bonds is exhausted. Hence, an amount of aromatic solvent components such as xylene containing several times the moles of double bonds per each mole of double bond in the reactant is preferred. The ratio is dictated by the duration of ozonization after the solution is saturated with ozone. The longer the run the larger the ratio.

Certain polymers useful as starting materials in the present invention, when ozonized in a mixed aliphatic-aromatic solvent, will form cross-linked gels. The cross-linked gels are insoluble in hydrocarbon solvents.

R. Criegee in Paper 120, Am. Chem. Soc. Meeting, N.Y., Sept. 1951 has suggested that attack of ozone on a carbon-carbon double bond results in bond cleavage to produce a zwitterion and a carbonyl containing compound. We believe that in this case zwitterions or carbonyl oxides, are formed and then further react. They can react with the carbonyl containing compound formed from the cleavage of the double bond, or with other carbonyl containing compounds which are present in the solution, to form ozonides and possibly result in a gel. Alternatively two zwitterions may react to form cyclic peroxides. This and other reactions of the carbonyl oxide may also cause gel formation.

Polymers useful as starting materials of the present invention and having one or both of the following features may form cross-linked gels:
1. Multiple pendant carbon-carbon double bonds.
2. Multiple carbon-carbon internal double bonds on highly branched polymer.

Such cross-linking reactions may be useful to produce foams or coatings and may serve to produce coagulation of a variety of systems. The resultant cross-linked material may be useful in preparing films and membranes via further modifications. The gels may serve to allow controlled release of materials into the environment.

In most industrial processes, it is desirable to avoid the formation of gels during the process of preparing reactive polymers. In order to control or avoid gel formation carbonyl containing compounds may be added to the reaction mixture. Certain of the first component solvents inhibit gel formation e.g. carbonyl compounds. Ketones, such as acetone, methyl ethyl ketone, 1-cyclohexyl-1-propanone, 2,4-pentanedione, 4-oxo-cyclohexane carboxylic acid and the like can be used. Aldehydes, such as formaldehyde, acetaldehyde, cyclohexanecarbaldehyde and the like can also be used. The concentration of the ketone or aldehyde is adjusted to prevent cross-linking and is normally a minor component of the solvent system. The amount of carbonyl compound added relative to the polymeric carbon-carbon double bonds can be from about 1 to 10 and preferably from about 2 to 5. When used to prevent cross-linking the concentration of the aldehyde or ketone is much lower than when used as a solvent component with reactivity intermediate between the carbon-carbon double and single bond. Ketones are less effective than aldehydes at preventing cross-linking and should be used in higher concentrations.

An alternative technique to avoid gel formation is to add a monofunctional unsaturated material when reacting the polymer having multiple pendant carbon-carbon double bonds or a highly branched polymer. Both the monofunctional unsaturated material and the polymer will react with ozone to yield low molecular weight products and soluble polymer. For example, oleic acid and EPDM may be simultaneously reacted with ozone to produce polymer with pendant carboxylic acid functionality together with azelaic and polargonic acids.

A partial list of effective materials include 1-hexene, ethylene, propylene, 1-butene, cis-2-butene, trans-2-butene, 1-pentene, cis-3-hexene, trans-3-hexene, styrene, α-methylstyrene, any 1-alkene, any 2-alkene.

Ozonization Process

An ozone containing gas is contacted with the polymer solution. Ozone can be produced in various ways such as electrolytically, photochemically or in an ozonator discharge. The ozone can be generated by means of a Welsbach apparatus. Typical operating conditions of a Welsbach apparatus are voltages of about 100 volts, a pressure of about 7 pounds per square inch over atmospheric pressure and a flow of ozonized air of about 0.06 cubic feet per minute. Compressed air can be the source of oxygen.

It is normally desirable to operate below the boiling point of the solvent components, however, this does not preclude reaction above these temperatures if such processing condition may be desirable for reasons of solubility, selectivity of attack etc. Frequently, the minimum reaction temperature is dictated by precipitation of the starting material. However, it is possible that the same reaction can also be carried out in suspension.

The temperature for the ozonizing reaction may be within a wide range. It is limited on the upper end by the boiling point of the solvent at the applied pressure and at the lower end by the precipitation of the polymer from the particular solvent mixture. It may be also advantageous to vary the temperature during the process. The ozonizing reaction can take place in a temperature range of between about 20° C. and 160° C. and preferably in the range of between about 80° C. and 140° C. at atmospheric pressure.

Ozone reacts rapidly with isolated open chain ethylenic linkages and less rapidly with 2 or more conjugated double bonds or those present in aromatic bond systems. It reacts more readily with a carbon-carbon double bond than with carbon-nitrogen double bond. Double bonds in the straight chain are attacked more readily than double bonds in the ring structure.

PRODUCTS

The resulting ozonides are of varying thermal stability and include gels and dissolved molecules. The ozonides can be cleft in a conventional manner. Such conventional ozonide cleaving means include acids, bases, oxidizing and reducing agents. When the ozonization process is completed, the resulting intermediate species are fragmented to form a stable final product.

Agents useful for cleaving ozonides include peroxoacids and mild oxidizing agents. Preferably, peroxoacid mixtures are composed of a molar ratio between about 2:1 and 1:2 of peroxide such as hydrogen peroxide and acidic function such as provided by glacial acetic acid. Preferably peroxoacids are employed in such amounts as to provide an excess of peroxide compared to that theoretically required. Preferably peroxoacids are employed in such amounts as to provide between about 1.5 and 3 molecules of peroxide for each end group formed after cleaving is accomplished. For example by adding to the reaction mixture relatively small amounts (i.e. 2–40% by volume) of a 1:1 by volume mixture of 30% hydrogen peroxide and of glacial acetic acid a splitting of the ozonide is achieved. This treatment is carried out above the precipitation temperature of the product until the reaction is completed. In the process of the present invention ozonization followed by ozonide cleaving by $H_2O_2$/acetic acid can be used, starting with unsubstituted olefinically unsaturated hydrocarbon polymers, to lead to a pure dicarboxy product. Preferably the ozonide solution is treated for between about 10 minutes and 3 hours at temperatures between about 90° and 180° C.

The cleavage product can be precipitated into a large excess of methanol, filtered, and washed several times to remove any low molecular weight dicarboxylic acids such as succinic and adipic which may have been formed, and then finally dried under vacuum. The average molecular weight of a wash product is higher than that calculated on the basis of the carbon-carbon double bond in the starting material. Furthermore, it was observed that the molecular weight $M_n$ of the final product appears to be affected by the distribution of the double bonds in the starting material. Our products differ from the products obtained from like starting materials by methods of previous workers in that such prior art products include also esters, ketones and aldehydes. For example, employing a copolymer of ethylene and 1,4-hexadiene as starting material, a poly(carboxymethyl) substituted polyethylene wherein from about 0.05 to 1.3 percent of the hydrogen atoms of polyethylene are substituted by carboxymethyl groups.

The resulting stable dicarboxylic acid products of our process are useable as a starting material for further polymerization. By condensation polymerization thereof with an appropriate coreactant step, it is possible to obtain very long chains which are not branched.

Moreover these dicarboxylic acid products are useful as surfactants. Preferred surfactants of this nature are useful for treatment of polyethylene surfaces, for enhancing the adhesion of polymers, as modifiers for adhesives, for ion exchange resins, waxes, and the like.

In addition, these dicarboxy compounds can be converted into salts (ionomers). These polymeric salts can be homogeneously blended with a compatible polymer in the desired concentration. Compatability is most easily achieved for the diacid and major polymer by having the same backbone. This is, however, not a necessary and full condition and full compatability is not always desired. The blending process can be either by dissolving both materials in a common solvent with subsequent stripping, or by mixing them in the fused or softened state.

Since the preparation of the ionomers according to this invention is dependent on the presence of cleavable double bonds in aliphatic chains, the technique lends itself to the preparation of a wide variety of ionomers in which the diacids originate from copolymers containing double bonds along the aliphatic backbone chain. The counter ions to the polymeric acids can be monovalent or polyvalent and broaden the variety of possible systems. Introducing the ionizable carboxylic acids as carboxy terminated lower molecular weight polymer blended with the compatible higher molecular weight polymer can lead to flexibility in formulation and new desirable properties. Certain polyethylenes containing carboxy salts are known commercial products. The chain extension of these low molecular weight waxes via the carboxyl salt terminal functionality provides an improved wax.

Ionomers can also be prepared by our process from copolymers having pendant unsaturation. For example an ionomer can be prepared from a copolymer of ethylene and 1,4-hexadiene, or an ethylene-propylene, 1,4-hexadiene terpolymer via ozonolysis and subsequent reaction with base. The concentration of the ionic species is controlled by the concentration of the pendant double bonds. In this manner ionomers can be made from polymers produced via mechanisms (anionic, coordinated anionic) which are not compatible with polar monomers.

Applications

A use of the materials of the present invention involves reaction with other compounds to produce higher molecular weight polymers or cross-linked polymeric materials. The materials of the present invention can provide impact improvement of thermoplastics such as acrylics, polystyrene, ABS and the like. Both polyester and Nylon-6 may be reached with these materials to produce a new material with improved impact resistance. Such modification may be expected to improve the water absorption characteristics of Nylon-6, as well. A more flexible Nylon-6 is useful for a variety of applications, including flexible tubing.

The long chain monomers of the present invention are suitable as additives for impact improvement to thermosetting resins such as epoxy, unsaturated polyester and the like. Carboxy terminated polymers can serve as a starting material for production of epoxy systems.

Unsaturated polyester impact improvement may be accomplished by the addition of vinyl terminated polymers.

The vinyl terminated polymers may be prepared by reacting vinyl monomers having other functionality which will react with the carboxy or hydroxy functionality of the polymers prepared by the process of this invention. Monomers such as p-vinylbenzoic acid, acrylic acid, methacrylic acid or their acid chlorides may be reacted with hydroxy containing polymer. Allyl alcohol, or the half ester of a glycol and one of the above-mentioned vinyl acids may be reacted directly with polymer containing carboxylic acid or acid chloride functionality. Alternately, compounds having hydroxy groups may be reacted with phosgene to form chloroformate and then reacted with hydroxy containing polymer. Other free radically reactive species may be attached to hydroxy containing polymer by reaction of maleic anhydride with such polymer.

Alternatively, carboxyl terminated polymers of the invention can be used to react with other acids and glycols to produce new alkyds which can then be diluted with monomers such as styrene, if desired.

The products of the invention have potential use for thermoset resins by proper formulation of amorphous and crystalline reactive polymers with appropriate monomer and the resulting thermoset resin can have high impact resistance and particularly good chemical resistance in aqueous environments. The long chain monomers of the present invention are suitable in place of terminal polyols in urethane formulations and in segmented polyesters.

The long chain monomers of the present invention can be employed for preparing new unsaturated polyester alkyds for obtaining flexible polyester resins.

The long chain monomers of the present invention can be ingredients for preparing thermoplastic elastomers. Combination of amorphous reactive polymer with either polyamides or polyesters in the appropriate composition range (probably 65-75 volume percent elastomer) potentially gives thermoplastic elastomers having excellent high temperature use properties, limited by the crystalline melting point of the polyester or polyamide.

The materials of the present invention can provide improved adhesion of condensation polymers with polyolefins. Block copolymers based on terminally reactive hydrocarbon polymers should prove useful. Such materials may be added either to the polyolefin or to the condensation polymer or may even be synthesized during extrusion. There is a growing need to manufacture bilayer films comprising films of different properties such as bilayer films of Nylon-6 with polyolefins. The materials of the present invention can improve long-term stability and give good low temperature flexibility.

The materials of the present invention can provide liquid systems to produce reinforced elastomers. Such systems are presently available based on vinyl terminated polybutadienes dissolved in various monomers. Simply replacing the polybutadiene with a saturated elastomer of the invention can give a useful material.

A carboxy terminated saturated elastomer can be end capped with either a polyamide or polyester to yield a material with high use temperature and excellent long-term aging properties. Such material containing as little as 5–10 weight percent of end blocks can be mixed with an appropriate high temperature plastic to produce less expensive thermoplastic elastomers.

Long chain monomers of the present invention made from block polymers incorporating olefinic backbones and conventional condensation polymers can be used to facilitate the blending of individual homopolymers. Upgraded polyethylene and improved impact nylon or polyesters can be obtained incorporating these materials.

Long chain difunctional and multifunctional containing polymeric and oligomeric vinyl functionality can be the basis for new thermoset resins and/or flexible vulcanizates.

Heat deformable elastomers and plastics can be defined as exhibiting the following characteristics:

1. On heating to an elevated temperature, T, deformed and cooled to room temperature in deformed state, remains in such a deformed state.
2. Then on reheating to T, the material returns to its original shape.

A non-cross-linked plastic of this type is conceived from block copolymers of carboxy terminated polyethylene with either a saturated polyester or a polyamide. The volume fraction of the polyethylene should be in the range 65–85%. The polyester or polyamide domains serve as cross-linking and reinforcing domains when the material is deformed above the crystalline melting point of the polyethylene.

An elastomeric thermoplastic material can be produced by utilizing a three component block copolymer consisting of:

a. A conventional polyester, a polyamide or a polyurethane.
b. A terminally reactive polyethylene of the present invention.
c. A terminally reactive saturated elastomer of the present invention.

The materials of the present invention can provide polyethylene with improved processibility. Vinyl terminated polyethylene of low molecular weight may be extruded more easily than high molecular weight material. It seems reasonable that reaction of this terminal functionality should give rapid and effective network formation.

Hydroxy terminated polymers are useful as a direct replacement for polyols in urethane formulations.

The materials of the present invention can be used as polymeric initiators. Difunctional free radical initiators can be prepared from these materials. Such initiators will allow block type polymers to be produced, or, will allow one to obtain different rate molecular weight relationships. It will allow control of relative initiator concentration in two phase polymerizing systems which is not possible with conventional initiators. For example, polymerization of styrene in the presence of ethylene propylene rubber will cause separation to give one phase with polystyrene in monomer, and the other phase of ethylene propylene rubber in styrene monomer. If initiator is attached to the ethylene propylene rubber, that initiator will be present solely in the phase containing rubber and monomer.

The materials of the present invention may serve to produce synthetic oils.

The materials of the present invention can also provide fire-retardant additives. A broad spectrum of additives are possible containing controlled amounts of halogen and may be used in almost any of the preceding application areas where improved fire-retardancy is important.

EXAMPLE 1

An ethylene butadiene copolymer, designated as EB-1 was used as a material for ozonization. It contained, according to the infrared analysis, about 1.7 weight percent of doubly bonded carbon atoms which are almost exclusively incorporated in the main chain. This butadiene modified polyethylene EB-1 had an intrinsic viscosity in decahydronaphthalene at 135° C. of 1.67 deciliters per gram. According to the relationships of Francis et al. J. Polymer Sci. 31,453 (1958), the intrinsic viscosity [n] equals $6.77 \times 10^{-4} \times M_v^{0.67}$ leading to a "viscosity" molecular weight, $M_v$, of 115,000. The molecular weight $M_n$ of the polymer was determined from the solution viscosity in xylene at 105° C. Under these conditions the relationship, intrinsic viscosity equals $2.0 \times 10^{-4} \times M_n^{0.82}$, of Delacuesta and Billmeyer, J. Polymer Sci., A1, 17 (1963) holds for narrow fractions of PE. This method yields an $M_n$ of 58,000 for the above starting polymer. This value agrees with the osmometry value, which was also obtained [$M_n$ approximately 50,000]. $M_v$ to $M_n$ ratio is therefore approximately 2. (Since the viscosity relationships above are for pure polyethylene, it is possible that the presence of double bonds and branches in the starting materials affects the $M_v$ by $M_n$ ratio significantly).

In this example the polymer EB-1 was dissolved in a two component solvent system of this invention. The system consisted of 45 parts by volume of decahydronaphthalene as the inert solvent, mixed with 10 parts by volume of xylene as the ozone reactive compound. The solvents selected are suitable for confining the ozone attack to the double bonds of the copolymer and for meeting the criteria necessary for polymer solubility and solvent compatability. The reactivity of decahydronaphthalene is about the same as that of polymer single bonds. Use of this solvent component increases the total number of potentially reactive single bonds in the system, thus supplementing the protective effect of the xylene component against ozone attack on the polymer single bond.

Solutions of the above polymer were prepared in a half-filled three-necked round bottom flask which was immersed in a thermostatically controlled silicon oil bath. The polymer was dissolved at 125° C. and the solution was cooled to 80° C. before ozone was passed through it. The solution prepared had 8 weight percent of polymer in the solvent mixture at 125° C. The flask was equipped with a mechanical stirrer, a condensation column and a fritted glass ozone inlet immersed below the liquid surface. The ozone was generated by means of a Welsbach apparatus. The operation conditions of the Welsbach apparatus were 90 to 100 volts, a pressure of 6 to 8 pounds per square inch above atmospheric pressure was employed and a flow rate of ozonized air of about 0.06 cubic foot per minute was obtained. Compressed air was the source of the oxygen. The effluent gases were passed from the condenser head through polyvinyl chloride plastic tubings to two scrubbers appropriately filled with aqueous potassium iodide solution. Once the ozone started coming over, then free iodine appeared which develops a yellow color in this solution. After 8 to 10 minutes from the start of the ozonization for the solution, saturation with ozone was reached.

The absence of ketone, aldehyde and ester groups was determined by IR analysis and indicates that polymer single bonds were not attacked. The reaction can be followed by withdrawing aliquot proportions of about 100 cubic centimeters each at a predetermined time interval. Each such proportion was treated with about 2 cubic centimeters of 1:1 ratio by volume of 30% hydrogen peroxide/glacial acetic acid for 30 minutes at about 100° C. Under such conditions, intermediate reacted species such as ozonides and peroxide decompose and produce stable oxidization products such as acids, esters, ketones and aldehydes. The components of the products and the ratio between such components did not depend on the amount of hydrogen peroxide/acetic acid mixture employed and even drastic increases did not produce appreciable changes.

The treated solution was kept at 100° C. with air passing through it for an additional hour. This completes stabilization of the oxidized products and removed the large excess of ozone from the solution. The product was then precipitated into large excess of methanol. It was filtered, washed several times and finally dried under vacuum.

The resulting products were dissolved in decahydronaphthalene at 135° C. for determination of the molecular weight. A chemical end-group analysis successfully resulted in the determination of free carboxylic acid by titration of the products with potassium hydroxide solution in benzyl alcohol to determine number average molecular weight, Mn.

Solutions of the monomer in tetrachloroethane were obtained and scanned with respect to nuclear magnetic resonance. The infrared scans of the ozonized material were obtained from potassium bromide pellets. The infrared scans were calibrated internally for establishing the relative intensities of the absorption bands. It was found that the ozonizing reaction can be followed by measuring the changes in transmittance of specific bands in the infrared relatively to the transmittance at 2660 cm$^{-1}$. The absorption bands of interest are the free acid band [1708 cm$^{-1}$], the ester band [1160 cm$^{-1}$] the trans-double-bond band [965 cm$^{-1}$] the ketone-aldehyde band [1730 cm$^{-1}$] and the shoulder at 1690 cm$^{-1}$.

The infrared analysis of the starting material indicated that only a very small part, about 1% of the total double bond content, is of the vinyl type. Therefore the number of double bonds calculated from the intensity of 965 cm$^{-1}$ band was used to estimate the double bonds left in the system as a function of reaction time. The band at 1730 cm$^{-1}$ is associated with both ketone and aldehyde groups, it does not well resolve and it is impossible to determine quantitatively the relative amounts of these two residues.

In contrast to the product obtained from the mixed solvent system it is estimated from the IR absorbance that their total amount is of the order of the free acid for the product obtained from tetrachloroethane. The shoulder at 1690 cm$^{-1}$ is most probably associated with a diacid separated by 2 to 3 methyl groups.

A typical product is characterized in the entry (C) of Table 1. The 2660 cm$^{-1}$ IR-absorption does not change during the reaction.

The Acid IR Absorbance in Table 1 1708 cm$^{-1}$/2660 cm$^{1}$ indicates the relative quantity of carboxyl groups present from the ratio of the absorbance at 1708 cm$^{-1}$ to the nearly constant absorbance at 2660 cm$^{-1}$. The ester IR absorbance 1160 cm$^{-1}$/2660 cm$^{-1}$ indicates the relative quantity of ester groups present from the ratio of the absorbance of 1160 cm$^{-1}$ to the nearly constant absorbance at 2660 cm$^{-1}$. Entries (A) and (B) of Table 1, using a single solvent show by comparison values for the ester-IR absorbance ratio significantly greater than zero; i.e. show presence of ester groups in the polymer subjected to the ozonization procedure of this example, but using only a single solvent.

TABLE 1

Ozonolysis of Polymer EB-1

| Sample No. | Reaction Time (hrs) | M$_v$ | M$_n$ | Acid IR Absorbance 1708 cm$^{-1}$/ 2660 cm$^{-1}$ | Ester IR Absorbance 1160/2660 cm$^{-1}$ |
|---|---|---|---|---|---|
| (A) Tetrachloroethane - Reaction Temperature 100° C. | | | | | |
| 1 | 0.5 | 38,000 | 25,000 | — | — |
| 2 | 1.0 | 20,900 | 9,300 | 1.6 | 0.4 |
| 3 | 1.5 | 17,000 | 5,800 | 2.6 | 0.8 |
| 4 | 2.0 | 11,800 | 3,900 | 3.0 | 1.3 |
| (B) Tetrachloroethane - Reaction Temperature 110° C. | | | | | |
| 5 | 0.25 | 43,000 | 27,800 | 0.7 | — |
| 6 | 0.50 | 27,500 | 15,400 | 1.0 | 0.3 |
| 7 | 0.75 | 27,000 | 14,100 | 1.2 | — |
| (C) Decahydronaphthalene/xylene 45:10 by volume, Reaction Temperature 80° C. | | | | | |
| 8 | 1.2 | 21,300 | 6,300 | 2.0 | 0.0 |

Blank indicates value not measured.

Comparison of Samples 2 and 8 in Table B 1 shows (by the molecular weight values) that although degradation of polymer EB-1 has occurred to a similar extent in both samples, there is no appearance of ester absorption when the xylene/decahydronaphthalene mixture is used as solvent whereas there is significant ester absorption in tetrachloroethane solvent. The last column of Table 1 is a ratio indicating that the 1160 cm$^{-1}$ ester is zero for Example 8; the 2260 cm$^{-1}$ absorbance being nearly constant from sample to sample. Infrared examination of absorbance at 965 cm$^{-1}$ indicates that the carbon-carbon double bonds have been reacted completely.

The only recoverable products of bond cleavage in Sample 8 were long chain aliphatic acids and a measurable fraction of very short chain dicarboxylic acid with up to about 10 carbon atoms. These acids were soluble in hot ethanol and were separated by extraction.

EXAMPLE 2 (Comparison)

Ozonization in 1,1,2,2-Tetrachloroethane

In this example the ozonization was carried out in 1,1,2,2-tetrachloroethane. The polymer to be ozonized, EB-1, is soluble at elevated temperature in this solvent. (Inert chlorinated solvents are frequently employed in ozonization procedures described in the conventional art. Such solvents as 1,2 dichloroethane, carbon tetrachloride or dichloromethane are deficient in their ability to dissolve polymer EB-1). The primary solutions prepared had 5 to 8 weight percent of the polymer in 1,1,2,2-tetrachloroethane at 140° C. and the solutions were cooled to either 100° C. or 110° C. before passing ozone through the solution. The 100° C.-110° C. reaction temperature was chosen in order to obtain approximately the same concentration of polymer EB-1 in the tetrachloroethane reaction in the solvent as at 80° C. in the two-component solvent system of Example 1. After 8 to 10 minutes from the start of the ozonization for the solutions, saturation with ozone was reached in the solution.

It was found that ozonization in the chlorinated solvent results in excessive undesirable side reactions.

Table 1 sets out the changes with time of ozonization of the molecular weight and the acid and ester absorption bands in the product. The amount of both free acid and ester increase with time. It is important to note that absorption due to ester functionality begins to appear early in the reaction. Attack at the aliphatic single bonds occurs before complete reaction of the double bonds.

EXAMPLE 3

Production of Straight Chain Polyamides and Polyesters

The material set forth in Example 1 and designated as EB-1 was employed using the apparatus and procedure of Example 1, except that the solvent was a mixture 45/5 by volume of decahydronaphthalene/xylene. The temperature was between 80° and 125° C. when the reaction was carried out. It was found that the reaction time till observation of saturation with ozone increased with decreasing temperature. The reaction products were determined for the preceding examples. With a reaction time of 1.2 hours and a reaction temperature of 80° C., a $M_V$ of 21,300 resulted and the titration gave 0.159 Meq COOH/gr corresponding to number average molecular weight $$M_n = \frac{1000}{(0.15912)} = 12,600.$$

IR scans were obtained showing that these products contained no ketone, aldehyde or ester groups in amounts discernible by this technique. This is evidenced by the absence of IR bands in the 1730 cm$^{-1}$ and 1160 cm$^{-1}$ regions.

The carboxy terminated polymer was reacted first with 1,6-hexadiamine to form an acid salt and then polymerized by conventional procedure to yield a polyamide.

Alternatively, the carboxyl terminated degradation products were reduced by means of sodium bis(2-methoxyethoxy)aluminum hydride (Vitride, trademark of National Patent Development Co.), to yield hydroxy terminated products.

The hydroxy terminated products and ethylene glycol, in the molar ratio of 1:20, were reacted with an equal molar amount of dimethyl terephthalate for 1 hour at 190° C. in the presence of 0.1 weight percent zinc chloride based on total monomer charge of hydroxy terminated products, glycol and dimethyl terephthalate. 0.1 weight percent antimony acetate was added and the reaction mixture was heated to 280° C. under vacuum for 2 hours to produce high molecular weight polyester. Solubility studies in selective solvents indicated that the resultant products are polyester copolymers of the alpha, omega-dihydroxy polyalkylene ozonization reduction products, plus the glycol, plus the terephthalate and not a mixture of polymers.

For both the polyester and the polyamide, products soluble in the usual solvents for such polymers were obtained which indicates that the ozonolysis led to products whose functionality did not significantly exceed 2. These products were white. In marked contrast, polyesters and polyamides prepared from ozonolysis products prepared in 1,1,2,2-tetrachloroethane (described in Example 5) were insoluble in the same solvents and were discolored.

Since long chain aliphatic diacids and diols cannot be conveniently prepared by a direct synthesis method this ozonolysis procedure has technological potential and the reaction products satisfy a long felt need.

EXAMPLE 4

This Example was carried out in the same manner as Example 3; however, the initial polymer was an ethylene/butadiene copolymer with 4% by weight of double bonded carbon atoms. The results were similar to those obtained in Example 3. Soluble polyesters and polyamides were produced in the same manner as described in Example 3.

EXAMPLE 5

The same ethylene/butadiene copolymer and solvent mixture as employed in Example 1 was used; and the same general procedure was employed for ozonization and for production of carboxy groups. The ozonization time selected was 70 minutes. It was found by infrared analysis of the degradation product that all double bonds had reacted. Additionally the infrared scan showed no traces of ester or ketone aldehyde groups.

The absence of ketone and aldehyde groups indicated that polymer single bonds were not attacked by the ozone. The only recoverable products were aliphatic acids. A measurable fraction of these acids were short chain dicarboxylic acids containing up to about 10 carbon atoms. The absence of aldehyde absorption in the infrared spectra indicated that each molecule contained 2 or more carboxylic groups. Assuming difunctionality the titrational analysis resulted in a $M_n$ of 12,600 while osmometry yielded an $M_n$ of 13,400.

The carboxylic acid terminated degradation products were reacted with diamines to form polyamide. Another portion was reduced by means of sodium bis(2-methoxyethoxy)aluminum hydride (available from National Patent Development Co.) to yield hydroxy terminated products. The hydroxy terminated products were condensed with terephthalic acid to form polyesters.

In additional runs the carboxylic acid terminated degradation products were reacted with diamines including 1,6-hexamethylenediamine to form the polyamides. In all cases soluble products were obtained which indicates that the ozonolysis led to products whose functionality did not significantly exceed 2. An increase in molecular weight was demonstrated by substantial increases in the viscosities of the resultant polymers relative to the viscosities of the carboxy and hydroxy terminated products, respectively.

EXAMPLE 6

40 grams of polymer EB-1 characterized in Example 1 was dissolved in 450 cubic centimeters decahydronaphthalene and 100 cubic centimenters xylene. Using the procedure of Example 1, ozone was passed though the solution at 80° C. for 70 minutes and it was found that ozone saturation of the solution occurs after 10 minutes. Then 50 cubic centimeters of 1:1, 30% hydrogen peroxide/glacial acetic acid were added. After 30 minutes air was passed through the 80° C. solution for 1 hour. The product was precipitated in methanol, washed in methanol and dried. The infrared scan indicated that all the double bonds were removed and that essentially all resultant carbonyl groups were present in carboxy groups. The molecular weight $M_V$ was 21,300 and $M_n$ was 12,500.

EXAMPLE 7

Ozonolysis of polymer EB-1 of Example 1 was carried out in the same manner as described in Example 1. The solvent system was 20:80 toluene/1,1,2,2-tetrachloroethane. The resulting product was a low molecular weight carboxy terminated polyethylene. This product did not exhibit the ester, or ketone-aldehyde infrared absorption which was obtained in the products of comparison Example 2.

EXAMPLE 8

Ionomeric polymers are examples of high molecular weight polymers in which ionized long chain diacid salts or polyacid salts of similar backbone are homogeneously blended. The ion concentration can be controlled by the change in the diacid chain length and by its amount in the total composition. The long chain acid salts are prepared by the ozonization procedure of Example 4 from higher molecular weight double bond containing copolymers. Subsequent salt formation from the resulting long chain diacids and polyacids can be obtained by conventional procedure.

10 g of carboxy terminated polyethylene of Example 3 (molecular weight, of $M_n$ equal to 12,600 and $M_v$ equal 21,300) was dissolved upon heating in 150 ml of xylene. 10 grams potassium hydroxide in 75 ml of hot benzyl alcohol was added to this solution. The transparent solution was kept at 140° C. for 30 minutes and then was poured into a large excess of cold acetone to precipitate the polymer. After several washings in acetone the infrared spectrum of the dried polymer showed that all the acid reacted to form the salt. The particular features of the infrared spectrum were a strong doublet typical of the carboxylate ion, replacing the singlet at about 1700 $cm^{-1}$ typical of the free carboxy acid.

The ionomer thus prepared, together with high molecular weight low density polyethylene in the ratio of 1:20, was dissolved in xylene at 130° C. and then precipitated into methanol, forming a homogeneous blend.

The ionomer is readily blended with high molecular weight polyethylene in the absence of solvents, in conventional mixing equipment such as Brabender mixers, two roll mills and extruders.

Ionomers are employed as adhesives, as coatings, as packaging films. Ionomers improve the printability of many polymeric surfaces. Ionomers are suitable for the formation of membranes.

EXAMPLE 9

Dihydroxy terminated polyethylene, obtained by the reduction of the ozonization product, as described in Examples 3 and 5, was dissolved in xylene upon heating. An equimolar amount of 2,4-toluenediisocyanate was added and the solution stirred for 30 minutes. The product was then precipitated in methanol, washed several times in methanol and dried. Depending on the batch, the viscosity of the product, as measured at 0.5% concentration in decahydronaphthalene was between 2.5 and 3 times higher than the viscosity of the dihydroxy terminated polyethylene. This indicated that a polyurethane with a higher molecular weight than the starting material was formed. Such polyurethanes can be used for production of open or closed pore foams, in "liquid rubber" formulations, and the like.

EXAMPLE 10

A terpolymer of ethylene-propylene-1,4 hexadiene was subjected to ozonolysis. This polymer contained 1.35 wt% carbon-carbon double bonds, as measured by infrared analysis, and had an intrinsic viscosity of 1.90 dl/g. in decalin at 25° C. A 5 wt% solution of this polymer was prepared in a 45:10 by volume decahydronaphthalene/xylene mixed solvent system.

180 mls. of this polymer solution was placed in a flask as described in Example 1 and held at 85° C. using a constant temperature oil bath. Air was bubbled through the stirred solution for 20 minutes. When ozone generation commenced a viscous foam immediately formed at the gas inlet and the entire reaction solution gelled. Such gellation could complicate industrial processes.

EXAMPLE 11

To the solution described in example 10, 3 volume % of benzaldehyde was added. Ozone was passed into the polymer solution for 30 minutes. During this period, there was no evidence of gel formation. Air was bubbled through the solution for one hour and 2 mls. of a 1:1 hydrogen peroxide (30%)/glacial acetic acid solution was added. Stirring was continued for another 60 minutes. The product was precipitated into methanol, filtered, washed and redissolved in hexane. The product was reprecipitated in methanol, filtered, washed and finally dried under vacuum. Infrared analysis indicated that the carbon-carbon double bonds had completely disappeared (I.R. absorption at 960 $cm^{-1}$) and carboxylic acids had been formed (I.R. absorption 1708 $cm^{-1}$). There was no indication of the formation of aldehydes, ketones or esters. The intrinsic viscosity of the polymer was 1.18 dl/g.

EXAMPLE 12

To the solution described in example 10, 3 volume % of methyl ethyl ketone was added. The experimental procedure was identical to that of example 11. Carbon-carbon double bonds were converted to carboxylic functionality and the methyl ethyl ketone was effective in preventing gel formation during ozonolysis.

EXAMPLE 13

A commercially available polybutadiene (Diene 35NFA-from Firestone Tire and Rubber Company) was partially hydrogenated. 20 grams of the polymer were dissolved in 500 mls. of xylene. 0.2 grams of chlorotris (triphenylphosphine) rhodium was added and the solution transferred to a one liter hydrogenating reactor equipped with a mechanical stirrer. The reactor was purged with hydrogen gas and hydrogenation was carried out at 810 p.s.i. pressure for 5¾ hours at room temperature. Infrared analysis indicated that all the vinyl double bonds and most of the cis double bonds were hydrogenated. Most of the remaining unsaturation was trans-configuration as indicated by infra-red absorption at $965^{-1}$. Titration with iodine bromine solution indicated that 91% of the double bonds had been hydrogenated.

7 grams of the partially hydrogenated polymer were dissolved in a 150 mls. of a mixed solvent-1:1 decahydronaphthalene to xylene by volume. Ozone was passed through the stirred solution at 80° C. for 30 minutes. Further reaction was carried out in a manner similar to that described in example 11 and product was precipitated into a large excess of methanol, filtered, washed in methanol and dried under vacuum. A white powdery material was prepared. Infrared analysis indicated that carboxylic acid functionality had appeared and that no residual carbon-carbon double bonds remained.

EXAMPLE 14

Preparation of Carboxylated EPDM

This ozonolysis reaction of an ethylene-propylenehexane-diene terpolymer was carried out in the presence of decahydronaphthalene and butyraldehyde. The same ozonolysis conditions were used as in example 1. The reaction mixture was composed of the following components: 5.0 g ethylene propylene diene terpolymer; 165 ml decahydronaphthalene; 10 ml butyraldehyde.

The butyraldehyde was added to the reaction mixture just prior to the introduction of the ozonized air. The ozonolysis reaction was carried out at 85° C. using a 3-necked flask equipped with mechanical stirring and a condenser. The constant temperature was maintained with a thermowatch.

The reaction was free of any cross-linking gel as the ozonized air passed into the solution. The ozonization was completed in one hour, the solution was oxidized with 0.5 ml each of 30% $H_2O_2$ and glacial acetic acid. After passing the air through it for an additional hour, the product was precipitated into a large excess of methanol. It was washed, filtered, then redissolved into hexane. It was then reprecipitated again with methanol and finally vacuum dried at 60° C.

The carboxylated products contained no unsaturation as measured by IR and titration. The product contained 0.81% weight acid groups as determined by IR. The inherent viscosity ($nsp/c$) of the carboxylated product is 1.10 dl/g as measured in decahydronaphthalene at 25° C.

No cross-linking gel was observed during the entire reaction. No side-products were also detected from this reaction. The carboxyl group peak at 1708 cm$^{-1}$ was very intensive and sharp.

EXAMPLE 15

Preparing Difunctional Carboxylated Oligomer 20 g of hydrogenated polybutadiene rubber was dissolved in 500 ml xylene. To the solution, 0.2 g of chlorotris (triphenyl phosphone) rhodium was added and shaken well. The mixture was hydrogenated in a 1-liter reactor equipped with mechanical stirrer and temperature and pressure automatic controlling apparatus. The hydrogenation reaction was carried out at room temperature for 5¾ hours. The product was precipitated from an excess of methanol. The hydrogenated product contained 3.8% double bond by weight or 4.1% by mole as measured by IR. The inherent viscosity was 0.70 dl/g, as measured in toluene at 25° C.

Ten grams of the hydrogenated polymer was dissolved in 400 ml of hexane and 20 ml of benzaldehyde. The ozonolysis reaction was carried out in a 3-necked 1-liter round bottom flask equipped with stirrer and condenser. The ozone in air was passed into the solution at 70° C. through a fritted glass. The reaction was completed in 60 minutes. The sample was oxidized and purified as in Example 14. The product was snow white in powdery form.

EXAMPLES 16-21

Tests of a Carbonyl Compound to Prevent Cross-Linking

These examples demonstrate that a low amount of benzaldehyde prevents the cross-link formation in the ozonization of EPDM. A starting EPDM contained 1.38% by weight of unsaturation.

The ozonolysis condition was identical to that of Example 1. 2.0 g of EPDM was used in each example. The samples were dissolved in 65 ml of decahydronaphthalene and various amounts of benzaldehyde as shown in Table I. Benzaldehyde served as the first solvent in Examples 16-21 and as an agent to prevent corsslinking in Examples 18-21. It can be seen that at a ratio of benzaldehyde to double bond of 2, the reaction does not lead to crosslinking gels.

TABLE II

| No. | EPDM Wt. (g) | Double Bond (m moles) | Benzaldehyde Wt. (g) | (m mole) | Gel Formation |
|---|---|---|---|---|---|
| 16 | 2.00 | 1.06 | 0.113 | 1.06 | Gels |
| 17 | 2.00 | 1.06 | 0.169 | 1.59 | Gels |
| 18 | 2.00 | 1.06 | 0.226 | 2.13 | Free of gels |
| 19 | 2.00 | 1.06 | 0.339 | 3.198 | Free of gels |
| 20 | 2.00 | 1.06 | 0.565 | 5.33 | Free of gels |
| 21 | 2.00 | 1.06 | 1.025 | 9.669 | Free of gels |

EXAMPLE 22

Preparation of Hydroxy-Containing EPDM

A 100 ml of aliquot was taken from the reaction vessel of Example 14 after 120 minutes of ozonization and before the mixture was treated with peroxide and acetic acid. At 85° C., the hot LiAlH$_4$ (50 g) in 10 ml of dioxane was added slowly to the solution with stirring. After continued stirring at 150° C. for 45 minutes, 2 ml of conc. H$_2$SO$_4$ as added to the solution and stirring continued for another 60 minutes. The pH of the solution was around 1.5-2.0. The solution was then poured into cold dry acetone to precipitate the polymer. The polymer was then filtered, washed and vacuum dried. White polymer was obtained.

By infrared analysis no carboxyl groups were detected in the product.

EXAMPLE 23

Preparation of Ethylenepropylenediene Elastomer Ionomer

Ten grams of the carboxylated EPDM polymer obtained from Example 14 was dissolved upon heating in 150 ml of xylene. 10 grams of sodium hydroxide in 150 ml of hot benzyl alcohol was added to this solution. The transparent solution was kept at 150° C. for 40 minutes and then was poured into a large excess of cold acetone to precipitate the polymer. The polymer was then washed with methanol. The precipitated polymer is quite white and not as sticky as the starting carboxylated polymer.

The samples were dried under vacuum and analyzed. The IR spectrum led to the conclusion that the carboxyl groups were completely converted to the ionic containing salt groups.

EXAMPLE 24

Cross-Linking of Carboxylated Ethylenepropylenediene Elastomer

Carboxylated ethylenepropylenediene elastomer prepared according to Example 14 was dissolved in hexane. 5 parts were taken from the resulting solution and the following cross-linking agents were added to individual parts:
(1) toluene diisocyanate
(2) hexamethylene diisocyanate
(3) 6-amino-1-hexanol
(4) 1,6-hexanediamine
(5) polyethyleneamine of a molecular weight of 1200.

Reagents 1 and 2 required some heating to effect a reaction, whereas reagents 3-5 reacted at room temperature. The cross-linking reaction resulted in an insoluble gel with each of the reagents.

EXAMPLE 25

Formation of Acid Chlorides from Carboxylated Ethylene Propylene Diene Elastomer Carboxylated ethylenepropylene diene elastomer prepared according to Example 14 was dissolved in hexane and then treated for three hours at 45° C. with thionyl chloride. Then the solvent plus excess thionyl chloride was stripped in a rotary evaporator, and the hexane was replaced. The resultant acid chloride containing polymer was used to carry out reactions A, B and C.

A. Ethylene glycol was reacted with the acid chloride containing polymer in the presence of pyridine in a Schotten Baumann reaction to yield a product cross-linked by ester groups. It was attempted without success to redissolve the product.

B. 1,6-hexamethylenediamine was reacted with the acid chloride containing polymer and a cross-linked product resulted with amide bridges.

C. Cotton fibers were reacted with the solution containing the acid chloride containing polymer together with a comparison sample containing no acid chloride. After careful washing, drying and weighing, an increase in the weight of the cotton fibers in contact with the acid chloride by over 5% of their initial weight was measured. No such increase was observed in the comparison sample. The increase indicates that some of the acid chloride containing polymer had been grafted onto the cotton fibers.

EXAMPLE 26

Cross-Linking of EPDM Polymer from Ozonization In the Presence of Simple Olefinic Compounds This example illustrates the minimum amount of simple organic olefin compound required for stopping the gel formation when EPDM was treated with ozone. The starting EPDM (Nordel 1320) contained 1.38% by weight of unsaturation. 1.89 g of the EPDM elastomer was dissolved in 65 ml of decahydronaphthalene with various amounts of heptene-2 as shown in Table III. It can be seen that at a ratio of heptene-2 to double bond above 1.5, the reaction is free of cross-linking gels.

TABLE III

| Sample No. | Elastomer Weight (g) | D.B. (m moles) | Heptene-2 (g) | Heptene-2 (m moles) | Remarks |
|---|---|---|---|---|---|
| 1 | 1.89 | 1.00 | 0.098 | 1.0 | gels |
| 2 | 1.89 | 1.00 | 0.98 | 10.0 | free of gels |
| 3 | 1.89 | 1.00 | 0.588 | 6.0 | " |
| 4 | 1.89 | 1.00 | 0.245 | 2.5 | " |
| 5 | 1.89 | 1.00 | 0.196 | 2.0 | " |
| 6 | 1.89 | 1.00 | 0.147 | 1.5 | almost no gels |

EXAMPLE 27

Ten grams of an (ethylene propylene 1,4-hexadiene) elastomer, Nordel 1320, was dissolved in 250 ml of hexane. After the polymer was completely dissolved, a 75 ml aliquot was cast in a polyethylene container in 19 cm×27 cm area equipped with ozone inlet and outlet. The ozone was generated by means of a Welsbach T-23 Laboratory Ozonator. At 0.06 cubic feet per minute flow rate, the ozone/compressed air mixture was introduced to the wet film at room temperature for 30 minutes. The total system was purged with compressed air for 30 more minutes. A cross-linked solid film was obtained after this ozone treatment. This gel was stable after exposure to 110° C. in decahydronaphthalene for 48 hours. Also, the ozonized film was stable to exposure of hydrogen peroxide and acetic acid in hexane at 50° C. No degradation was noted in 48 hours.

EXAMPLE 28

A 3.5 mil thick dry film made by film casting from (ethylene-propylene-1,4-hexadiene) elastomer Nordel 1320 was put in a container and treated with ozone air at room temperature at a flow rate of 0.06 cubic feet per minute for 60 minutes. The resultant film could not be redissolved when placed in decahydronaphthalene at 110° C. for 24 hours. Also, exposure to hydrogen peroxide-acetic acid in hexane solvent for 24 hours did not destroy the gel.

EXAMPLE 29

120 g of a polyethylene having a terminal ethenyl group available as PAXON ® (Trademark registered to Allied Chemical Corporation) Grade SS55-250, having 0.186 wt.% terminal unsaturation as measured by infrared is dissolved in 1600 ml of decahydronaphthalene in a 2 liter resin kettle at 110° C. and 75 mls of benzaldehyde is added. An ozone air mixture is passed through the solution through a fritted glass inlet while the solution is being rapidly stirred for 90 minutes. (Air was passed through the solution at a rate of 0.06 cu/ft per minute and the ozone at a rate of approximately 0.41 millimoles/minute). A 80 ml sample is removed from the reaction solution (Sample A), filtered, washed with hexane, then methanol and dried in a vacuum oven overnight.

20 ml of 30% hydrogen peroxide and 20 ml of glacial acetic acid are added to the remainder of the reaction mixture at 110° C. and stirring is continued for 60 minutes with compressed air bubbling through the solution. After cooling to room temperature, the reaction mass becomes gelatinous. It is filtered, washed with hexane several times and then dried in a vacuum oven at 50° C. overnight (Sample B). Some low molecular weight material is collected in solvent which had been filtered off the gelatinous mass. Sample B is a monocarboxyl terminated polyethylene having a number average molecular weight of 14,000.

Films are pressed from Samples A and B at 182° C. for 30 seconds and infrared analysis carried out. Both samples show similar infrared spectra with Sample A having 0.150 wt.% acid and Sample B having 0.144 wt. % acid.

We claim:

1. A process for selectively ozonizing a carbon-carbon double bonds of an olefinically unsaturated organic polymer also containing carbon-carbon single bonds having a number average molecular weight larger than about 40,000 with between about 0.1 and 10 percent of the backbone carbon-carbon bonds being unsaturated, comprising:

dissolving the olefinically unsaturated organic polymer in a solvent system having a first component which is less reactive than said double bonds but more reactive than said single bonds toward ozone and a second component which is inert to ozone under the reaction conditions; and contacting the resulting solution with ozone containing gas, thereby forming an ozonide.

2. The process according to claim 1 wherein the solution is at a temperature of between about 20° C. and 160° C.

3. The process according to claim 1 wherein the unsaturated organic polymer has an essentially straight main chain containing a plurality of double bonds.

4. The process according to claim 3 wherein the unsaturated organic polymer is a copolymer of butadiene and ethylene.

5. The process according to claim 1 wherein the unsaturated organic polymer contains in the backbone two or more of the structures

 (A)

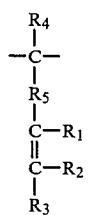 (B)

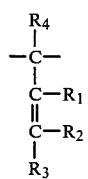 (C)

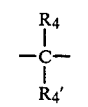 (D)

where $R_1$, $R_2$, $R_3$ $R_4$ and $R_4'$ are independently for each substructure hydrogen, halogen, alkyl-substituted amino, oxy, peroxy or hydroxy radicals, ether groups, hydrocarbon radicals or substituted hydrocarbon radicals; and $R_4$ and $R_4'$ together can be oxo or thio; $R_5$ is a divalent hydrocarbon radical, substituted hydrocarbon radical, ether radical, divalent sulfide, sulfone and the like, divalent nitrogen;

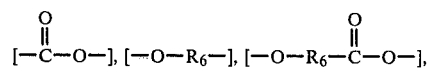

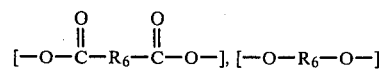

where $R_6$ is a divalent hydrocarbon radical or substituted hydrocarbon radical, divalent sulfide, sulfone and the like, divalent nitrogen radical and the like and wherein the backbone chains have end groups including one or more of the structures

 (E)

 (F)

wherein $R_1$, $R_2$, $R_3$ are independently hydrogen, halogen, alkyl-substituted amino, peroxy or hydroxy radicals, ether groups, hydrocarbon radicals or substituted hydrocarbon radicals and where $R_1$ and $R_2$ together can be oxo or thio radicals.

6. The process according to claim 5 wherein a structure of the type $(R_7)_x-$ is incorporated in the polymer wherein $R_7$ is a polyfunctional hydrocarbon radical having a functionality of x where x is between about 3 and 100.

7. The process according to claim 5 wherein the unsaturated organic polymer is a copolymer.

8. The process according to claim 1 wherein the olefinically unsaturated polymer is a partially hydrogenated and/or halogenated and/or hydrohalogenated unsaturated polymer.

9. The process according to claim 1 wherein the first component is an aromatic hydrocarbon.

10. The process according to claim 9 wherein the aromatic hydrocarbon is xylene.

11. The process according to claim 9 wherein the aromatic hydrocarbon is toluene.

12. The process according to claim 1 wherein the first component is a chlorinated aromatic hydrocarbon.

13. The process according to claim 1 wherein the first component is a carbonyl containing compound.

14. The process according to claim 13 wherein the carbonyl compound is butyraldehyde.

15. The process according to claim 13 wherein the carbonyl containing compound is benzaldehyde.

16. The process according to claim 1 wherein the second component of the solvent is a saturated organic compound having a boiling point from about 60° C. to 300° C.

17. The process according to claim 16 wherein the saturated organic compound is a member of the group consisting of cyclic hydrocarbons.

18. The process according to claim 16 wherein the saturated organic compound is 1,1,2,2-tetrachloroethane.

19. The process according to claim 16 wherein the saturated organic compound is decahydronaphthalene.

* * * * *